G. H. WILLANS.
FEED WATER HEATING AND WATER CIRCULATING APPARATUS FOR LOCOMOTIVE AND OTHER BOILERS.
APPLICATION FILED MAR. 1, 1916.

1,247,769.

Patented Nov. 27, 1917.
5 SHEETS—SHEET 1.

FIG. I.

INVENTOR.-
GEORGE HERBERT WILLANS
by
Attorney.

G. H. WILLANS.
FEED WATER HEATING AND WATER CIRCULATING APPARATUS FOR LOCOMOTIVE AND OTHER BOILERS.
APPLICATION FILED MAR. 1, 1916.

1,247,769.

Patented Nov. 27, 1917.
5 SHEETS—SHEET 2.

INVENTOR—
GEORGE HERBERT WILLANS
by
Attorney

G. H. WILLANS.
FEED WATER HEATING AND WATER CIRCULATING APPARATUS FOR LOCOMOTIVE AND OTHER BOILERS.
APPLICATION FILED MAR. 1, 1916.

1,247,769.

Patented Nov. 27, 1917.
5 SHEETS—SHEET 4.

INVENTOR:-
GEORGE HERBERT WILLANS
by
Attorney

UNITED STATES PATENT OFFICE.

GEORGE HERBERT WILLANS, OF LONDON, ENGLAND.

FEED-WATER-HEATING AND WATER-CIRCULATING APPARATUS FOR LOCOMOTIVE AND OTHER BOILERS.

1,247,769.     Specification of Letters Patent.     Patented Nov. 27, 1917.

Application filed March 1, 1916. Serial No. 81,514.

*To all whom it may concern:*

Be it known that I, GEORGE HERBERT WILLANS, a subject of the King of Great Britain and Ireland, residing at London, England, (whose post-office address is 41 Moorfields, in the city and county of London, England,) have invented certain new and useful Improvements in and Relating to Feed-Water-Heating and Water-Circulating Apparatus for Locomotive and other Boilers; and I do hereby declare the following to be a full, clear, and exact description of the invention, such as will enable others skilled in the art to which it appertains to make and use the same.

This invention relates to feed water heating and water circulating apparatus for locomotive and other boilers.

In an apparatus known to the applicant the feed water in the normal working of the apparatus is passed through a heater and fed into the upper part of the boiler, and the apparatus is such that when the feed of fresh water is interrupted water flows, by way of certain valve devices and pipes, from the lower part of the boiler through the heater and is again delivered into the boiler at the upper part, a circulation of boiler water being thus obtained, while in the event of it being necessary, for any reason, to cut the heater and circulation means out of service, which can be done by manipulating certain valves and removing others, the feed water will be introduced into the bottom of the boiler without passing through the heater.

The present invention has for its object improvements in feed water heating and water circulating apparatus of the general kind above referred to.

The present invention principally consists in the provision, in feed water heating and boiler water circulating apparatus, for locomotive and other boilers, of the kind in which valve devices are provided on the inlet and outlet sides of the heating means whereby the latter may be put out of communication with the boiler and the boiler fed through the intake of the water circulating means, of a valve device at the water inlet side of the heating means so constructed and arranged that when operated to put the heating means out of communication with the boiler it opens in the apparatus the path for feeding the boiler through the said part of the water circulating means. The improved valve device just referred to and the shut-down valve at the outlet end of the heater are, according to this invention, such that they can be readily operated and the change in the feed effected without opening the smoke box or opening any valve casing to remove a valve. A further improvement on the above-mentioned known construction of apparatus lies in the form of element employed in the heater which is such that the heating surface is slightly increased while the passage of the water through the interior and of fire gases along the exterior of said element is somewhat retarded, thus increasing the amount of heat transferred to said water from the fire gases.

In the accompanying drawings,—

Fig. 6 shows in plan the pipe 10, Fig. 5, and

Like reference symbols indicate like parts in the several figures of the drawings.

Figure 1:
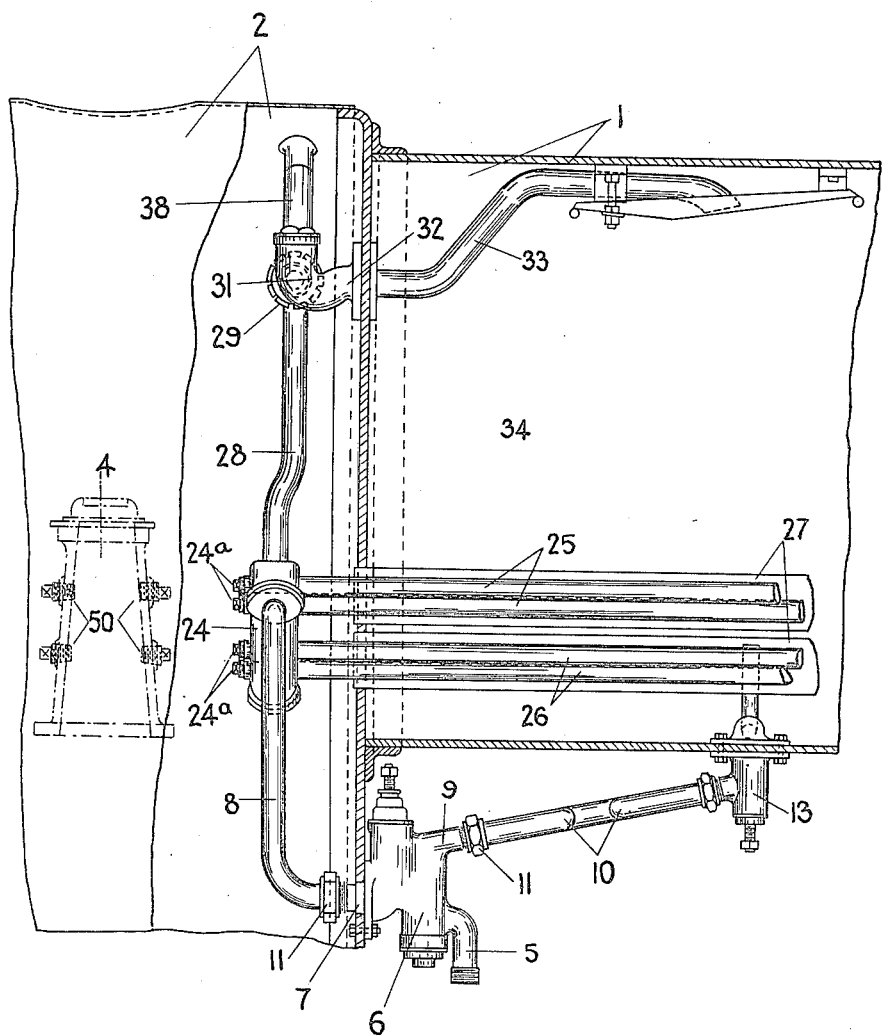
Figure 1 is a side elevation, partly in section of the smoke box end of a locomotive boiler fitted with the improved feed water heater and water circulator according to this invention.

Referring to the drawings, 1 is the boiler shell, and 2 the smoke box shell of a locomotive boiler, 3 being smoke tubes of ordinary or usual diameter, and 4 the blast pipe. 5 is a spigot formed or provided on the valve casing 6 (Figs. 1 and 5) to which spigot the supply pipe from the boiler feed pump or injector is connected, and 7 is another spigot on the valve casing 6 to which one end of the pipe 8 leading to the heater is connected, 9 being a third spigot on the valve casing 6 to which one end of the pipe 10 leading from the bottom of the boiler 1 is connected. These pipes are connected to their respective spigots by back-nuts such as 11, 11 or in any other convenient manner. The pipe 10 at its other end is connected to a spigot 12 on a valve casing 13 which is suitably secured, as by bolts 14, to the boiler shell 1. Within the boiler 1 a fitting 15 is mounted to which one or more pipes 16 are connected, the pipe or pipes 16 extending upwardly to the desired extent, for instance to the level of second or third row from the bottom of the boiler tubes, upwardly in the boiler. The pipe or pipes 16 are secured to the fitting 15 so that their lower ends open into the bore or interior 17 of the fitting from which bore 17 a port 18 leads and communicates through a hole 19 in the boiler shell with a port 20 leading to the interior of valve casing 13. 21 is a valve seat formed at the end of port 20 and 22 is a valve provided with a screwed spindle 23 and adapted, in certain circumstances, to be seated against the seat 21 for the purpose of closing the port 20.

Figure 2:
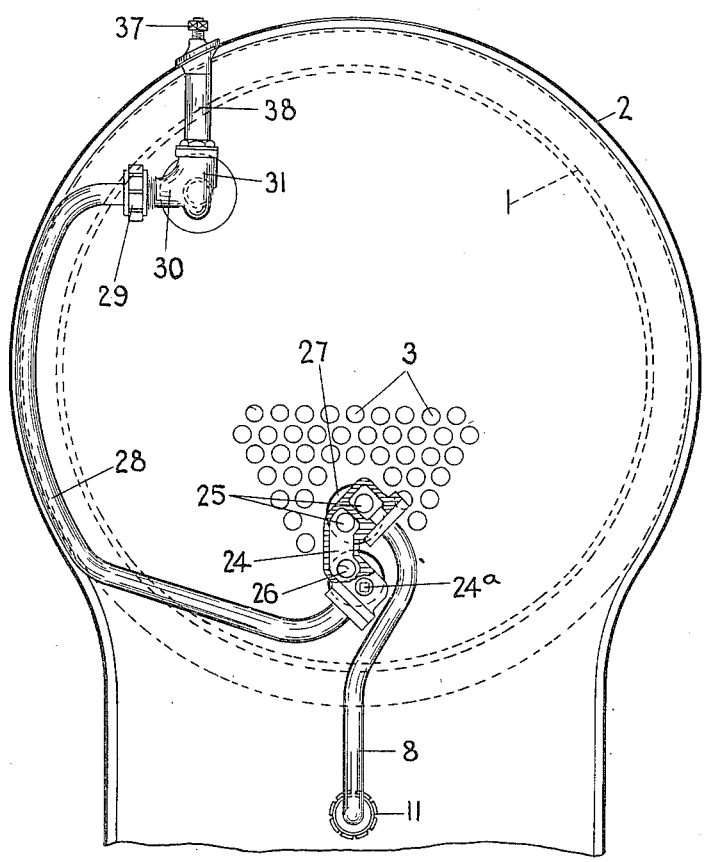
Fig. 2 is an end elevation, partly sectional, of the boiler with heater and circulator shown in Fig. 1.
Figure 3:
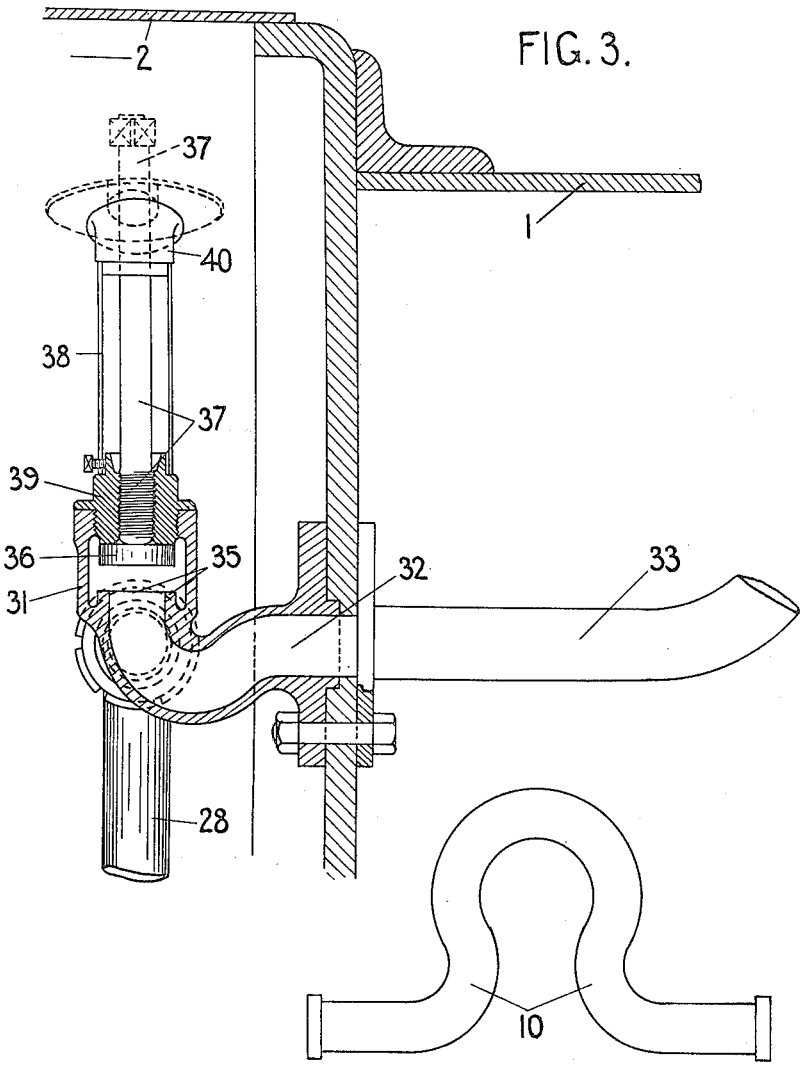
Figs. 3 and 4 are elevations, partly sectional, of the valve at the delivery end of the circulating and heating apparatus, drawn to a larger scale than Figs. 1 and 2.
Figure 4:
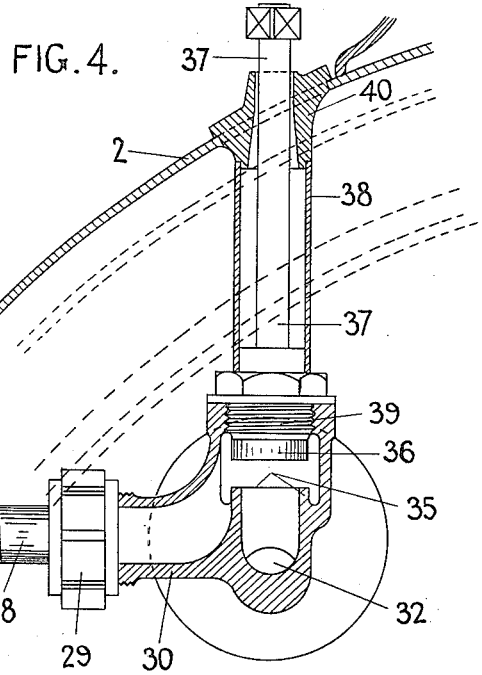
Figure 7:
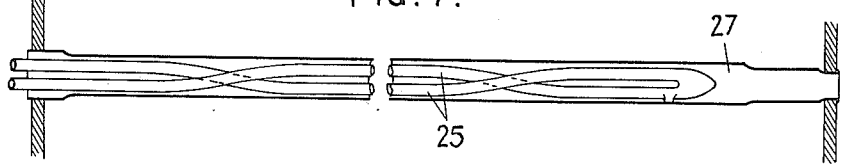
Fig. 7 illustrates an improved form of heating element which may be employed as a part of the improved heating and circulating apparatus according to this invention.

The pipe 8 at its upper end is connected to a header 24, Figs. 1 and 2, divided into chambers, to the rear wall of which header the inlet and outlet ends of the heater elements 25, 26 are connected in any suitable manner, for instance, and as is shown in Figs. 1 and 2, by being expanded directly into holes in said rear wall, in which figures 24ª are screwed plugs closing holes in the front wall of the header, through which holes a tube expander may be introduced to expand the ends of the elements. The chambers of the header 24 in the construction shown are such that the heating elements 25, 26 are in series. The elements 25, 26 are arranged in enlarged smoke tubes 27 which are of the desired diameter, and such elements may be and preferably are of the form shown in Fig. 7, i. e. the two lengths of pipe forming an element are twisted together to the desired extent so that a more or less tortuous passage is provided for the water and also so that the fire gases have a spiral path through the smoke tubes 27 and are thus retarded or delayed somewhat in their passage so that they give up more heat to the water in pipes 25, 26 than would be the case if the pipes forming the elements were straight as in Fig. 1.

The header 24 is connected at its outlet side to one end of the pipe 28 the other end of which is connected, for instance by a back-nut 29, to a spigot 30 on the valve casing 31, a branch 32 from which is connected through a hole in the smoke box tube plate with a delivery pipe 33. The delivery pipe preferably delivers the water downwardly on to a distributing plate 34 as shown, which has the effect of causing such water to be "sprayed" into the steam space of the boiler. The delivery pipe 33 and plate 34 are preferably so arranged that the water is delivered at as high a point in the boiler as is practicable. A valve seat 35 is provided in the valve casing at the inlet to branch 32, 36 being a valve provided with a threaded stem or spindle 37 and adapted to be, in certain circumstances, seated upon the valve seat 35. The stem 37 extends to the exterior of the smoke box and is surrounded by a tube or sheath 38 secured in place so as to make an air tight joint respectively with the tapped and threaded plug 39 of valve casing 31 and with a spindle guide or bearing 40 secured air-tightly in the smoke box shell 2, whereby the valve spindle 37 is operable to manipulate the valve 36 from outside the smoke box without affecting the vacuum obtaining therein.

Figure 5:
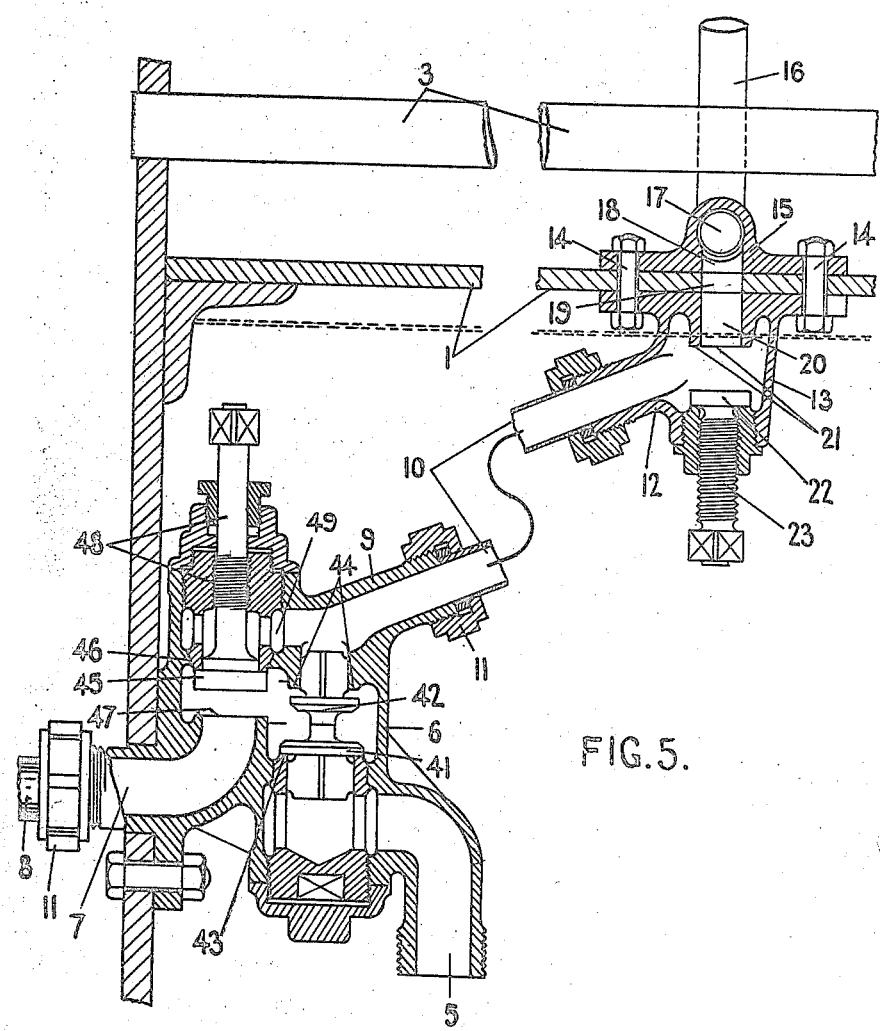
Fig. 5 is an enlarged sectional elevation of the several valve devices shown in Fig. 1 at the inlet end of the circulating and heating apparatus.

Referring now more particularly to Fig. 5, within the valve casing 6 three valves are provided, viz. two miter and automatically operating circulator clack valves 41, 42 seating respectively on valve seats 43, 44, and a manually operable valve 45 having an upper and a lower valve face which are adapted to be seated respectively against valve seats 46, 47. The valve 41 in its lowermost or seated position closes communication between the interior of valve casing 6 and spigot 5 and valve 42 in its uppermost or seated position closes one means of communication between the interior of valve casing 6 and the spigot 9. The valve 45, which is provided with a threaded operating spindle 48, in its uppermost seated position shown closes communication by way of ports or passages 49 between the interior of the valve casing 6 and the spigot 9, and in its lowermost position, i. e. seated on seat 47, closes communication between the interior of the valve casing and spigot 7 and opens communication through ports 49 with spigot 9.

The blast pipe 4 may be provided with holes through which means for cleaning the heater may be passed such holes being closed by screwed plugs 50 as indicated in Fig. 1.

The operation of the apparatus, briefly described, is as follows:—

With the parts in the positions shown in the drawings, and assuming water is to be fed to the boiler, water from the feed pump or injector is delivered beneath valve 41 lifting same, which action also raises valve 42 and causes it to seat on seat 44 and close communication of the pipe 10 with the valve casing 6, and the water passes by way of the valve casing 6, spigot 7, pipe 8 and header 24 to and through the heating elements 25, 26, and thence by pipe 28, valve casing 31 and branch 32 to the delivery pipe 33 where it is delivered into the boiler. When the desired amount of water has been so fed to the boiler, being heated on its way, the feed pump or injector is stopped and the valves 41, 42 drop, the valve 41 closing communication between the interior of the valve casing 6 and the branch or spigot 5 and the valve 42 opening communication between pipe 10 and the interior of the valve casing 6. Water from the lower part of the boiler will now flow through pipe 16, valve casing 13, pipe 10, valve casing 6, pipe 8, header 24, elements 25, 26, pipe 28, and valve casing 31 to delivery pipe 33 where it is redelivered at the upper part of the boiler. A circulation is thus maintained while the feed is stopped, the water being heated in the elements 25, 26 as well as being circulated.

If for any reason it is desired temporarily to shut down the above described circulation but to continue to heat the feed water delivered to the boiler, it is only necessary for the driver to screw the valve 22 on to seat 21. On the other hand should it be desired to cut the heater elements 25, 26 out of service, for instance should a leak develop, it is only necessary to manipulate two valves, viz. valves 36 and 45, and it is not necessary to either open the smoke box or open a valve casing and remove a valve; the valve 36, which is manipulated from the outside of the smoke box, is screwed down on to seat 35 closing communication between valve casing 31 and branch 32, and the valve 45 is screwed down so that it is seated on seat 47 instead of seat 46 as shown, thus closing communication between the branch 7 and the interior of the valve casing 6 but opening communication between the interior of the valve casing 6 and the branch 9 by way of ports or passages 49. In addition to cutting out the heating elements this manipulation of the valves 36 and 45 shuts down the circulation of the water above described. Assuming water is now to be fed to the boiler, and valve 22 being in the open position shown, the water delivered to branch 5 lifts the valves 41, 42 as before, and passes into the interior of the valve casing 6 whence it passes around the valve spindle 48 to the boiler by way of ports or passages 49, branch 9, pipe 10, valve casing 13 and pipe or pipes 16.

What I claim as my invention and desire to secure by Letters Patent is:—

1. The combination, with a boiler; of a valve casing provided with an inlet for the feed water, a water chamber, and a combined inlet and outlet branch, said casing having also two clack valve seats which communicate with the said water chamber; a double-acting clack valve arranged between the said seats and controlling the passage of water between the said inlet and the said branch and the water chamber; said valve casing having also two stop valve seats which communicate with the said water chamber, and a by-pass passage between one of the stop valve seats and the said combined inlet and outlet branch; a delivery pipe connection between the other stop valve seat and the water space of the boiler, means for heating the water in its passage through the said delivery pipe connection, a pipe connection between the said branch and the water space of the boiler, and a double-acting stop valve controlling the passage of water between the said chamber and the two said stop valve seats, thereby permitting water to be forced through either pipe connection into the boiler, or to be circulated from one pipe connection to the other and through the boiler.

2. The combination, with a boiler, of the valve casing 6 provided with the water inlet passage 5, adapted to be connected to the feed water supply pipe, and the passage 7 connected with the inlet pipe 8 leading to the heating apparatus, the passage 9 with which the pipe 10 in communication with the lower part of the boiler is connected, the double acting clack valve 41, 42 controlling communication between the inlet 5 and the passages 7 and 9, the by-pass passage 49 for communication between the passages 5 and 9, and the manually operated double acting stop valve 45 which in one position closes communication between the passages 5 and 9 through passage 49 and at the same time opens communication between the passages 5 and 7 and in another position of said valve it opens communication between the passages 5 and 9 through the by-pass passage 49 and at the same time closes communication between the passages 5 and 7, for the purposes set forth.

In testimony whereof I have affixed my signature, in presence of two witnesses.

GEORGE HERBERT WILLANS.

Witnesses:
W. K. SINSON,
W. H. LEWERS.